No. 688,268. Patented Dec. 3, 1901.
N. SCHMITT.
PROCESS OF PRODUCING MINE EXPLODERS.
(Application filed Dec. 30, 1897.)
(No Model.) 2 Sheets—Sheet 1.
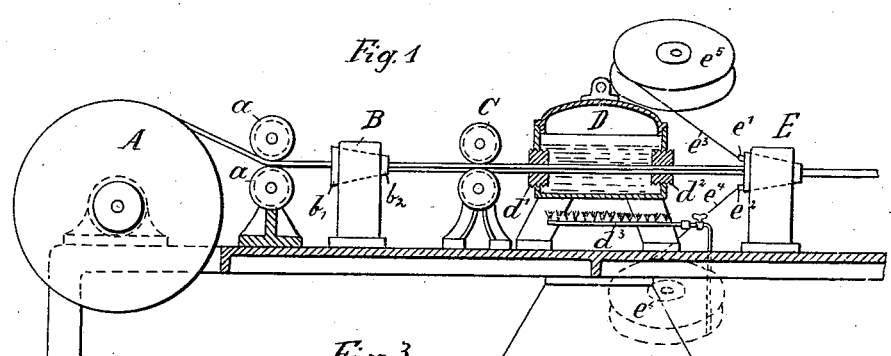
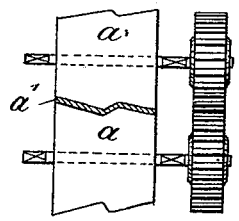
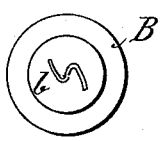
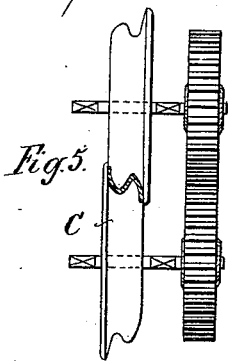
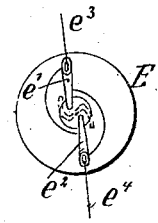
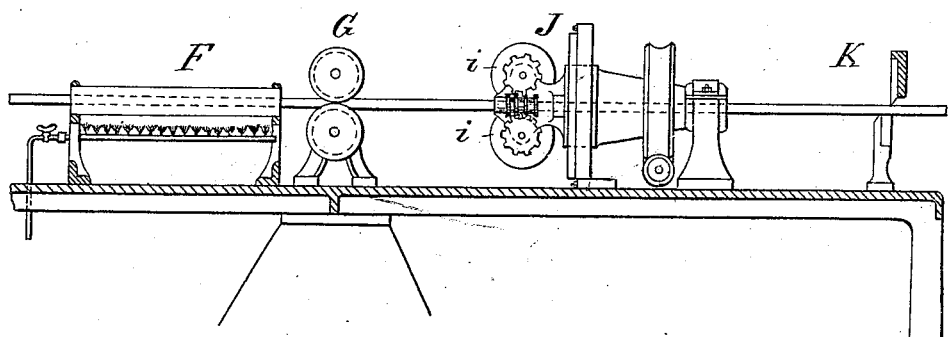
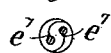
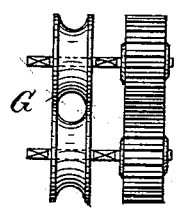
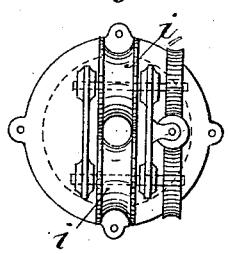
Witnesses:
Inventor:
Niclaus Schmitt
by: Eustace W. Hopkins
Att'y No. 688,268. Patented Dec. 3, 1901.
N. SCHMITT.
PROCESS OF PRODUCING MINE EXPLODERS.
(Application filed Dec. 30, 1897.)
(No Model.) 2 Sheets—Sheet 2.
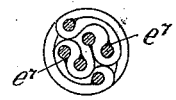
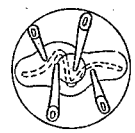
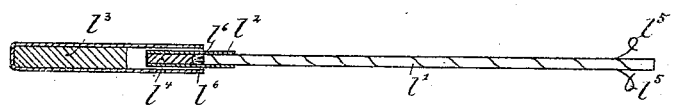

UNITED STATES PATENT OFFICE.

NICOLAUS SCHMITT, OF KÜPPERSTIG, GERMANY.

PROCESS OF PRODUCING MINE-EXPLODERS.

SPECIFICATION forming part of Letters Patent No. 688,268, dated December 3, 1901.

Application filed December 30, 1897. Serial No. 664,782. (No specimens.)

*To all whom it may concern:*

Be it known that I, NICOLAUS SCHMITT, manufacturer, of Küpperstig, in the German Empire, have invented a new and Improved Process of Producing Mine-Exploders, of which the following is a specification.

In the preparation of electric mine-fuses special regard should be paid to the following points: first, to use a cheap, sufficiently durable, and suitable insulating material; second, to effect the enveloping and insulating of the conductors by mechanical means in the cheapest possible way, but at the same time; third, to lay the ends of the fuse-conductors—that is, the fuse-points—always at the requisite equal distance from each other and in the simplest manner and to insure this, if possible, by the nature of the shaft itself, and, fourth, to simplify as far as possible the equipping of the fuse with the blast-capsule. A process and a machine in the working of which these points are kept in view are represented in the accompanying drawings, in which similar letters of reference denote similar parts throughout.

Figure 1 is a side elevation of the machine, partly in section, showing the left-hand end of the same; and Fig. 1ª is a continuation of Fig. 1, showing the right-hand end of the machine; Fig. 2, a detail elevation of the shaping-rolls on a larger scale; Fig. 3, a detail front elevation of the first drawing-plate; Fig. 4, a cross-section through the strip after it has passed through the said drawing-plate; Fig. 5, a detail side elevation of the drawing-rolls; Fig. 6, a detail front elevation of the guide-block for feeding the wires to the strip; Fig. 7, a cross-section through the strip with the wires therein. Fig. 8 is an end elevation of the rolls through which the strip with the wires passes; Fig. 9, a similar elevation of the twisting-rolls; Fig. 10, a side elevation of the finished cord with the fuse-head in section; Figs. 11 and 12, cross-sections through a modified form of strip; Fig. 13, a diagram of the opening of the shaping-plate to produce a cord of the cross-section shown at Fig. 11, and Fig. 14, an end elevation of a feed-guide for four wires.

A strip of pasteboard of a certain width is unwound off the roller A and formed by the pair of cylinders $a$, having the profile represented in Fig. 2, into the shape $a'$. This pasteboard strip thus bent forward is in further course of process converted to a draw-plate B. Owing to the peculiar form of the opening $b$ in this draw-plate (see Fig. 3) the cross-cut of the pasteboard strip is transformed into the shape shown in Fig. 4. The opening in the draw-plate B is so constructed that the bent-forward pasteboard strip enters the outer surface $b'$, having the profile $a'$ of Fig. 2, then following the sides of the perforation is forced onward until it treads out at the outer surface $b^2$ from the draw-plate B, having the form of the cross-cut represented in Fig. 4. The pasteboard strip is drawn through the draw-plate B by means of the cylinders C, which are set in motion and which are so shaped that the form of the cross-section, Fig. 4, of the pasteboard strip is preserved. The pasteboard strip passes now into the vessel D, containing a size which is insoluble in water and to which at the same time may be added for its better insulation another insulating substance or impregnating medium. The entrance and exit of the pasteboard strip into the vessel D is effected through the linings $d'$ and $d^2$, which also have the opening represented in Fig. 4. With some sorts of size which may be used it will be necessary to keep the bath warm, for which the heating apparatus $d^3$ serves. After leaving the bath the pasteboard strip arrives at a second draw-plate E, in which it is brought into contact with the conductors in the following manner:

The draw-plate E (see Fig. 6) is provided with two guides $e'$ and $e^2$, through which the conductors $e^3$ and $e^4$ are led into the interior of the draw-plate E, the conductors coming from rollers $e^5$ and $e^6$, which are attached at the side. The guides $e'$ $e^2$ are so arranged in the draw-plate E that the conductors $e^3$ $e^4$ are led into the inner corners of the pasteboard strip. During the moving forward of the pasteboard strip, together with the conductors, the edges of the pasteboard strip in consequence of the gradual narrowing in of the draw-plate E up to its projecting circular-shaped termination get folded around the conductors, enveloping the latter completely. In this way arises the circular full cross-cut. (Shown in Fig. 7.) The conductors are thus perfectly insulated from each other and from without by the pasteboard strip. By the strong pressure in the circular cross-cut of the draw-plate E the conductors are pressed into the material of the pasteboard strip, so that a perfect closing is effected. Should the pasteboard strip leave any corners or odd portions of the conductors $e^7$ not filled, they will be filled up by the size and impregnating substance which the pasteboard strip has carried with it from the bath D. Thus the aim is attained—namely, that the conductors and consequently their termini where the sparks emanate, are kept immovably firm in their position. Just as the bath D requires under certain circumstances to be kept hot, so does also the draw-plate E. After leaving the draw-plate E the newly-formed cord enters a pipe-shaped heater F, where it is dried. The cylinders G, whose profile is indicated in Fig. 8, perform the drawing of the cord through the draw-plate E. The velocity of the circumference of the two pairs of cylinders C and G is so regulated that G is slightly in advance in order to prevent the cord dragging or getting into folds. In order to insure that the surfaces which have been stuck together by the size shall in no case be loosened, the smooth completed cylinder-shaped cord is seized by the rollers $i$ by means of the contrivance indicated at J (see Fig. 9) and at the same time is pulled and firmly twisted on its own longitudinal axis. The cord may, however, by suitable apparatus be wrapped round or spun or plaited round. The scissors K cuts, either by hand or automatically, the endless cord into the required lengths.

Without in the least altering the principle of the invention the machine may be made so as to leave out altogether the two cylinders G and effect the drawing of the cord by the draw-plate E by means of the pair of cylinders J, while at the same time the twisting is effected from the draw-plate E. There may also be arranged behind the apparatus J, in front of the scissors K, a second drying apparatus similar to F.

The further step in the preparation of the finished fuse, as illustrated in Fig. 10, is conducted in the usual simple manner. The cut lengths of the cord $l'$ are provided with pasteboard cases $l^2$, in which the fuse mixture $l^4$ is placed, and on the pasteboard case $l^2$ is stuck the blast-capsule $l^3$. At the other end of the shaft $l'$ the conductors are bent upward from the pasteboard covering, which is cut open and tied in bows $l^5$, with which the electric-fuse battery is connected. The termini $l^6$ of the conductors are in the case of incandescent fuses connected by a bridge of material with strong electric resistance, while with spark-fuses the spark passes over in the fuse mixture $l^4$. The distance between the free ends $l^6$ of the conductors where the spark is formed is fixed once for all by the thickness of the pasteboard lying between them.

The fuse-head is advantageously formed by reducing the fuse mixture to a pulp in that a suitable binding medium is added thereto—such as tragacanth, acacia gum, collodium, or other suitable solution—and dipping the head therein, or by keeping the binding medium and the powdered fuse mixture separate and alternately dipping the head in the powder and solution and applying it to the end of the strip while damp, after which it will harden to a fast fuse-head.

In the same way as the embedding of two conductors $e^3$ $e^4$ in one pasteboard strip, as above described, is carried out, several conductors may at pleasure be insulated from each other in a simple pasteboard strip and be enveloped together. Figs. 11 and 12 show cross-sections in which the above-described process is applied to four and six conductors, respectively. Of course in such cases the draw-plates and pairs of cylinders receive corresponding different forms or profiles. Fig. 13 represents, for example, the back opening of the draw-plate B, and Fig. 14 the front view of the draw-plate E, with four conductors enveloped in one pasteboard strip.

In place of the pasteboard strip a strip of impregnated or non-impregnated linen, thick cloth, or thick paper, or anything similar may be used in the foregoing process.

Having now described my invention, what I claim, and desire to secure by Letters Patent, is—

A process for producing mine-exploders which consists in forming longitudinal creases in a strip of suitable material, impregnating the same material and feeding conductors into the said creases in such manner as to keep the same insulated from each other, closing the said strip to a cord, drying the same and applying the fuse to the end thereof substantially as described.

In testimony that I claim the foregoing as my invention I have signed my name in presence of two subscribing witnesses.

NICOLAUS SCHMITT.

Witnesses:
  M. HERWIG,
  W. GUMTAU.